United States Patent [19]
Nakayama

[11] 3,762,999
[45] Oct. 2, 1973

[54] METHOD FOR PRODUCING ADENOSINE DIPHOSPHATE AND ADENOSINE TRIPHOSPHATE

[75] Inventor: Kiyoshi Nakayama, Sagamihara-shi, Japan

[73] Assignee: Kyowa Hakko Kogyo Co., Ltd., Tokyo, Japan

[22] Filed: June 17, 1968

[21] Appl. No.: 737,313

Related U.S. Application Data

[63] Continuation of Ser. No. 658,356, Aug. 4, 1967, abandoned.

[30] Foreign Application Priority Data

Aug. 8, 1966  Japan............................ 41/51664

[52] U.S. Cl.............................................. 195/28 N
[51] Int. Cl.............................................. C12d 13/06
[58] Field of Search.................................. 195/28 N

[56] References Cited
UNITED STATES PATENTS 3,298,923  1/1967  Banno et al...................... 195/28 N
3,313,710  4/1967  Kinoshita et al.................. 195/28 N FOREIGN PATENTS OR APPLICATIONS
675,023  11/1963  Canada............................ 195/28 N Primary Examiner—Alvin E. Tanenholtz
Attorney—Craig, Antonelli, Stewart & Hill

[57] ABSTRACT

The present disclosure relates to a method for producing adenosine diphosphate and adenosine triphosphate which comprises culturing a microorganism capable of producing adenosine diphosphate and adenosine triphosphate in an aqueous nutrient medium under aerobic conditions in the presence of at least one carbohydrate as the main source of carbon. Advantageously, the culture medium contains carbohydrates in an amount of about 5 percent to 20 percent and inorganic phosphates in an amount of about 0.4 to 3 percent as $PO_4$. Adenine or its derivatives can be added to the culture medium at any time during culturing in an amount sufficient to accumulate the adenosine disphosphate or adenosine triphosphate in the culture medium. The microorganisms capable of producing adenosine diphosphate and adenosine triphosphate advantageously belong to the genera *Corynebacterium*, *Brevibacterium*, *Arthrobacter* and *Micrococcus*.

11 Claims, No Drawings

METHOD FOR PRODUCING ADENOSINE DIPHOSPHATE AND ADENOSINE TRIPHOSPHATE

CROSS REFERENCE TO THE RELATED APPLICATION

This application is a Continuation of copending application, Ser. No. 658,356, filed on Aug. 4, 1967 now abandoned.

The present invention relates to a process for producing adenosine disphosphate and adenosine triphosphate. More particularly, the present invention concerns a process for producing adenosine diphosphate and adenosine triphosphate by fermentation in the presence of a suitable carbon source, for example, carbohydrates, inorganic phosphates and adenine or its derivatives.

The adenosine diphosphate and adenosine triphosphate produced by the process of the present invention find many uses throughout the biochemical field. For example, adenosine disphosphate finds utility in cellular respiration. The rate at which foodstuffs may be burned is regulated by the requirements of the cell for useful energy. The utilization of adenosine triphosphate to drive the diverse energy-requiring processes of the cell automatically increases the available supply of adenosine diphosphate and inorganic phosphates, which in turn become available to react in the coupling mechanism and permit respiration to proceed. Adenosine diphosphate and adenosine triphosphate (noted hereinafter as ADP and ATP, respectively) also play an important role in the metabolism *in vivo* and furthermore are important as biochemical reagents, high-energy phosphoric acid additives and medicines. Adenosine triphosphate is also effective in acetyl coenzyme A synthesis, active sulfate synthesis, cholesterol synthesis, etc.

One of the objects of the present invention is to provide an improved process for the preparation of ADP and ATP which may be carried out in an efficacious and simple manner.

Another object of the present invention is to provide a process for producing adenosine diphosphate and adenosine triphosphate by a fermentation method on an industrial scale and in good yield.

A further object of the present invention is to provide an improved process of producing ADP and ATP at a low cost by fermentation in the presence of carbohydrates as the main carbon source.

Other objects and further scope of applicability of the present invention will become apparent from the detailed description given hereinafter; it should be understood, however, that the detailed description and specific examples, while indicating preferred embodiments of the present invention, are given by way of illustration only, since various changes and modifications within the spirit and scope of the invention will become apparent to those skilled in the art from this detailed description.

Pursuant to the present invention, it has been found that a much improved product and process for producing ADP and ATP may be obtained by culturing a microorganism capable of producing ADP and ATP in an aqueous nutrient medium under aerobic conditions in the presence of at least one carbohydrate as the main carbon source, inorganic phosphates and adenine or its derivatives in an amount sufficient to accumulate the adenosine disphosphate and/or adenosine triphosphate in the culture medium. In recovering ADP and ATP in high yields, the carbohydrates, inorganic phosphates and adenine or its derivatives are advantageously present in the culture medium in specific concentrations.

The bacteria which are capable of assimilating the carbohydrates and growing in the aqueous nutrient medium, thereby producing large quantities of ADP and ATP, are found in a wide number of species and genera. From the inventor's investigations and identifications, strains having particularly strong adenosine diphosphate and/or adenosine triphosphate-producing capabilities are those belonging to the genera *Corynebacterium*, *Brevibacterium*, *Arthrobacter* and *Micrococcus*.

As a result of various investigations on processes for producing adenosine disphosphate and adenosine triphosphate by utilizing microorganisms, the present inventors have found that significant amounts of ADP and ATP are accumulated in a culture medium by using microorganisms having the properties disclosed herein under specific fermentation conditions.

The microorganisms employed in the present invention have the characteristic that they produce ADP and ATP in the culture medium by conducting the cultivation in the presence of adenine. Microorganisms having this characteristic are widely distributed and cannot be limited to a specific taxon.

Excellent strains of microorganisms are obtainable from the microorganisms living in the soil, air, animal bodies and other natural environments or from stock strains by means of the following selection or screening method. The microorganisms are inoculated into 10 ml. portions of culture media contained in test tubes and comprising, for example, 10% glucose, 1% $K_2HPO_4$, 1% $KH_2PO_4$, 1% $MgSO_4.7H_2O$, 1% yeast extract and 30 $\mu$g/1 biotin. Culturing is then conducted with shaking. After 48 hours of culturing, adenine is added to the culture medium to bring the concentration thereof to 2 mg/ml. After an additional 48 hours of culturing, 0.01 ml. of the supernatent culture liquor is spotted on a filter paper and subjected to paper chromatography. The strains capable of forming ATP and ADP, to be selected for the process, are detectable by said chromatography with ultraviolet irradiation.

Exemplary of the microorganisms which can be used in the process of the present invention include bacteria belonging to the genera *Corynebacterium*, *Brevibacterium*, *Arthrobacter* and *Micrococcus*. These strains are used in the examples cited below.

The fermentation medium comprises either a synthetic culture medium or a natural nutrient medium which contains the essential nutrients for the growth of the microorganism strain employed. Such fermentation medium contains specific amounts of carbohydrates as the main carbon source and specific amounts of inorganic phosphates as well as other nutrients which are well known in the art such as, for example, a nitrogen source, inorganic compounds and the like which are utilized by the microorganism employed in specific amounts.

The culture medium employed in the present invention to produce ADP and ATP in high yields contains carbohydrates as the main carbon source in an amount of about 5 percent to 20 percent. The carbohydrates which can be used in the process of the present invention include for example, glucose, fructose, maltose, sucrose, starch, starch hydrolysate, molasses, and the like. Small amounts of other suitable carbon sources such as glycerol, mannitol, sorbitol, organic acids, hydrocarbons, etc., may be used in the fermentation medium along with the carbohydrates. The carbohydrates may be used either singly or in mixtures of two or more and any small amount of other carbon sources may also be present either singly or in mixtures of two or more.

The inorganic phosphates employed in the culture medium of the present invention to produce adenosine diphosphate and/or adenosine triphosphate in high yield are present in an amount of about 0.4 to 3 percent as the $PO_4$. Suitable inorganic phosphates which can be effectively used include sodium phosphate, sodium dihydrogen phosphate, sodium monohydrogen phosphate, potassium phosphate, potassium dihydrogen phosphate, potassium monohydrogen phosphate, and other similar inorganic phosphates. The preferred phosphates are potassium monohydrogen phosphate and potassium dihydrogen phosphate. Other inorganic compounds which may be added to the culture medium according to the present invention include magnesium sulfate, iron sulfate or other iron salts, magnesium chloride, calcium chloride, etc.

Adenine or its derivatives is added to the culture medium at any time during culturing in an amount sufficient to accumulate adenosine diphosphate and adenosine triphosphate in the culture medium. For producing ADP and ATP in high yields, the adenine or its derivatives are present in the culture medium in an amount of about 1 to 10 mg/ml. For concentrations lower than this amount, the amount of ADP and ATP is correspondingly lower. Furthermore, where larger amounts of adenine are used than those mentioned above, the conversion rate of adenine into ADP and ATP is low. Adenine or its derivatives may be added at the beginning of the culturing or during culturing. Adenine may be added in the form of innocuous salts such as the hydrochloride or sulfate or derivatives thereof such as adenosine which can readily be converted into adenine due to the characteristics of the strains employed. Other adenine derivatives include, for example, adenine riboside and adenine ribotide, including also the natural substances containing adenine as well as the situation wherein the microorganisms employed themselves produce adenine.

As a nitrogen source, various kinds of inorganic or organic salts or compounds, such as urea or ammonium salts such as ammonium chloride, ammonium sulfate, ammonium nitrate, ammonium phosphate, etc., or one or more than one amino acid mixed in combination, or natural substances containing nitrogen, such as cornsteep liquor, yeast extract, meat extract, fish meal, peptone, bouillon, casein hydrolysates, fish solubles, rice bran extract, etc., may be employed. These substances may also be used either singly or in combinations of two or more. It may also be necessary to add certain essential nutrients to the culture medium, depending upon the particular mioorganism employed, such as amino acids, for example, aspartic acid, threonine, methionine, etc., and/or vitamins for example, biotin, thiamine, cobalamin, and the like.

Fermentation is conducted under aerobic conditions, such as aerobic shaking of the culture or with stirring of a submerged culture, at a temperature of about 20° to 40°C. and a pH of about 5 to 9. Remarkably large amounts of adenosine diphosphate and adenosine triphosphate are found to be accumulated in the fermentation liquor.

After the completion of the fermentation, the adenosine diphosphate and adenosine triphosphate may be separated from the culture liquor by conventional means, such as ion exchange resin treatment, precipitation with metallic salts, extraction methods, conventional adsorption methods, chromatography and the like.

The following examples are given merely as illustrative of the present invention and are not to be considered as limiting. Unless otherwise noted, the percentages in the application and in the examples are by weight.

EXAMPLE 1

*Corynebacterium sp.* No. 3485 ATCC 21084 is used as the seed bacterium. It is cultured at 30°C. for 24 hours in a seed medium consisting of 2 percent glucose, 1 percent peptone, 1 percent yeast extract, 0.3 percent sodium chloride and 30 $\mu$g/l biotin.

The fermentation medium employed has the following composition:

120 g glucose
12 g $K_2HPO_4$
12 g $KH_2PO_4$
12 g $MgSO_4 \cdot 7H_2O$
6 g urea
10 g yeast extract
30 $\mu$g biotin per liter of the culture medium.

Of the above composition urea is separately sterilized as a 12 percent solution and added to 19 ml. of the rest of the fermentation medium which was previously sterilized in an autoclave under the conditions of 1 kg/cm² for 10 minutes.

The seed culture is inoculated into the 20 ml. of fermentation medium contained in a 250 ml. Erlenmeyer flask in an amount of 10 percent by volume thereof. Fermentation is carried out with aerobic shaking of the culture at 30°C. After 72 hours of culturing, adenine is added to the fermentation medium to give a concentration of 2 mg/ml. After an additional 48 hours of culturing, adenosine diphosphate and adenosine triphosphate are accumulated in the fermentation liquor in amounts of 1.1 mg/ml and 4.2 mg/ml, respectively.

The filtrate obtained by filtering cell bodies from the fermentation liquor was passed through a column of strongly basic anion exchange resin [Dowex 1(x2), chloride type ]. Each fraction of adenosine diphosphate and adenosine triphosphate obtained by the elution with hydrochloric acid was neutralized with caustic soda and subsequently treated with carbon powder. Thereafter it was concentrated and cooled. Crystals of sodium salts of adenosine diphosphate and adenosine triphosphate were obtained.

It was noted that if the above example is repeated changing only the concentration of glucose to 3 percent or changing only the concentration of $K_2HPO_4$ and $KH_2PO_4$ to 0.2 percent, all other conditions being maintained the same as above, the amount of ADP and the amount of ATP produced were in both cases 0.5 mg/ml or less, respectively.

EXAMPLE 2

*Arthrobacter sp.* No. 3486 ATCC 21085 is used as the seed microorganism and the other culture conditions are the same as in Example 1. The amounts of adenosine diphosphate and adenosine triphosphate accumulated in the fermentation liquor are 2.1 mg/ml and 3.8 mg/ml, respectively.

EXAMPLE 3

*Brevibacterium ammoniagenes* ATCC 6872 is used as the seed microorganism and the other culture conditions are the same as in Example 1. The amounts of adenosine diphosphate and adenosine triphosphate accumulated in the fermentation liquor are 0.6 mg/ml and 5.1 mg/ml, respectively.

EXAMPLE 4

*Micrococcus sodonensis* ATCC 15932 is used as the seed microorganism and the culture conditions are the same as in Example 1. The amounts of adenosine diphosphate and adenosine triphosphate accumulated in the fermentation liquor are 0.6 mg/ml and 1.7 mg/ml, respectively.

If Example 4 is carried out using 3 percent glucose or 0.2 percent $K_2HPO_4$ and $KH_2PO_4$, the amount of adenosine diphosphate and the amount of adenosine triphosphate accumulated are 0.3 mg/ml and 0.4 mg/ml, respectively in both cases.

The invention being thus described, it will be obvious that the same may be varied in many ways. Such variations are not to be regarded as a departure from the spirit and scope of the invention, and all such modifications are intended to be included within the scope of the following claims.

We claim:

1. A process for producing adenosine diphosphate and adenosine triphosphate which comprises culturing a microorganism capable of producing adenosine diphosphate and adenosine triphosphate and belonging to a genus selected from the group consisting of *Corynebacterium*, *Arthrobacter* and *Micrococcus* in an aqueous nutrient medium under aerobic conditions in the presence of at least one carbohydrate as the main carbon source, an inorganic phosphate and adenine or its derivatives, accumulating adenosine diphosphate and adenosine triphosphate in the resultant culture liquor, and recovering said adenosine diphosphate and adenosine triphosphate therefrom.

2. The process of claim 1, wherein the microorganism is *Corynebacterium sp.* No. 3485 ATCC 21084.

3. The process of claim 1, wherein the microorganism is *Arthrobacter sp.* No. 3486 ATCC 21085.

4. The process of claim 1, wherein the mircoorganism is *Micrococcus sodonensis* ATCC 15932.

5. The process of claim 1, wherein the carbohydrate is glucose and the inorganic phosphate is a mixture of potassium monohydrogen phosphate and potassium dihydrogen phosphate.

6. A process for producing adenosine diphosphate and adenosine triphosphate which comprises culturing a microorganism capable of producing adenosine diphosphate and adenosine triphosphate and belonging to a genus selected from the group consisting of *Corynebacterium*, *Arthrobacter*, and *Micrococcus* in an aqueous nutrient medium under aerobic conditions in the presence of about 5 to 20 percent carbohydrates as the main carbon source, about 0.4 to 3.0 percent inorganic phosphates as $PO_4$ and adenine or its derivatives in an amount sufficient to accumulate adenosine diphosphate and adenosine triphosphate, and recovering the adenosine diphosphate and adenosine triphosphate from the resultant culture medium.

7. The process of claim 6, wherein the adenine or its derivatives is present in the culture medium in an amount of about 1 to 10 mg/ml.

8. The process of claim 6, wherein the derivatives of adenine are selected from the group consisting of adenosine, adenine riboside and adenine ribotide.

9. The process of claim 6, wherein the microorganism is cultured under aerobic conditions at a temperature of about 20° to 40°C. and a pH of about 5 to 9.

10. The process of claim 6, wherein adenine or its derivatives is added to the culture medium at any time during culturing.

11. The process of claim 9, wherein the microorganism is selected from the group consisting of *Corynebacterium sp.* No. 3485 ATCC 21084, *Arthrobacter sp.* No. 3486 ATCC 21085, and *Micrococcus sodonensis* ATCC 15932.

* * * * *